US009420154B1

(12) United States Patent
Kubo

(10) Patent No.: US 9,420,154 B1
(45) Date of Patent: Aug. 16, 2016

(54) OBSERVATION SYSTEM HAVING A PLURALITY OF PROBES AND IMAGE CAPTURING METHOD THEREFOR

(71) Applicant: Tsuneyuki Kubo, Hachioji (JP)

(72) Inventor: Tsuneyuki Kubo, Hachioji (JP)

( * ) Notice: Subject to any disclaimer, the term of this patent is extended or adjusted under 35 U.S.C. 154(b) by 327 days.

(21) Appl. No.: 14/201,798

(22) Filed: Mar. 8, 2014

(51) Int. Cl.
*H04N 5/225* (2006.01)
*H04N 5/247* (2006.01)

(52) U.S. Cl.
CPC ............ *H04N 5/2256* (2013.01); *H04N 5/247* (2013.01); *G03B 2215/056* (2013.01); *G03B 2215/0557* (2013.01)

(58) Field of Classification Search
CPC ............... H04N 5/2256; H04N 2005/2255; H04N 5/247; G03B 2215/0557; G03B 15/02; G03B 15/03; G03B 15/05; G03B 2215/0596
USPC ............. 348/370, 371, 82, 83, 211.11; 362/3, 362/11, 13, 14
See application file for complete search history.

(56) References Cited

U.S. PATENT DOCUMENTS

| 5,337,732 A | 8/1994 | Grundfest et al. | |
|---|---|---|---|
| 7,480,450 B2 * | 1/2009 | Kobayashi | G03B 7/16 348/211.3 |
| 9,001,226 B1 * | 4/2015 | Ng | H04N 5/23203 348/211.11 |
| 9,179,091 B2 * | 11/2015 | Bezman | H04N 5/91 |
| 2003/0133018 A1 * | 7/2003 | Ziemkowski | H04N 5/2256 348/211.2 |
| 2006/0152634 A1 * | 7/2006 | Yeh | G06K 9/00711 348/701 |
| 2006/0284996 A1 * | 12/2006 | Kanai | H04N 5/232 348/294 |
| 2007/0053677 A1 * | 3/2007 | Steenburgh | G03B 15/05 396/155 |
| 2008/0231757 A1 * | 9/2008 | Tojo | G06K 9/00711 348/700 |
| 2008/0232765 A1 * | 9/2008 | Patten | G06T 5/50 386/248 |
| 2013/0128101 A1 * | 5/2013 | Midorikawa | H04N 5/2256 348/371 |
| 2013/0222628 A1 * | 8/2013 | Koike | H04N 5/2256 348/211.2 |

FOREIGN PATENT DOCUMENTS

| JP | 04212137 A | * | 8/1992 |
|---|---|---|---|
| JP | 2004297414 A | * | 10/2004 |

\* cited by examiner

*Primary Examiner* — John Villecco

(57) ABSTRACT

An observation system has at least two probes, and each probe has a camera and an illumination light source to illuminate an observation field of the camera. The at least two probes are able to move each other such that, in an observation field of a camera of one probe, an illumination light source of another probe may locate. To avoid disturbances caused by light from the illumination light source of the another probe, and use light from an illumination light source of the one probe to enhance image quality, image capturing by a camera of the one probe is performed within a period in which an illumination light source of the one probe to which the camera belongs is activated and the illumination light source locating in the observation field of the camera is inactivated.

28 Claims, 6 Drawing Sheets

OBSERVATION SYSTEM HAVING A PLURALITY OF PROBES AND IMAGE CAPTURING METHOD THEREFOR

BACKGROUND

1. Field of the Invention

The present invention relates to an observation system having a plurality of probes and an image capturing method for the observation system.

2. Description of the Related Art

A movable probe with a camera and an illumination light source for the camera has been known. Such a probe is disclosed in U.S. Pat. No. 5,337,732. However, when an observation system has a plurality of such probes, an operator must be careful that one probe's camera does not capture another probe's illumination light source; otherwise, overwhelming amount of light coming from the another probe's illumination light source might spoil the contrast of an image captured by the one probe's camera or cause flare and/or halation in the image thus degrades the image.

BRIEF SUMMARY

An observation system of the invention has at least two probes, and each probe has a camera and an illumination light source to illuminate an observation field of the camera. The at least two probes are able to move each other such that, in an observation field of a camera of one probe, an illumination light source of another probe may locate. To avoid disturbances caused by light from the illumination light source of the another probe, and to use light from an illumination light source of the one probe to enhance image quality, image capturing by a camera of the one probe is performed within a period in which an illumination light source of the one probe to which the camera belongs is activated and the illumination light source locating in the observation field of the camera is inactivated. It should be understood that when a camera of a probe has a long intermediate medium such a light guide between an optical system and an imager, at least an objective lens of the optical system is located in the probe, and that when a illumination light source of a probe has a long intermediate medium such as a light guide between a light exit and a light generating unit, at least the light exit is located on the probe.

More specifically, the present invention includes an observation system having a plurality of probes. The system at least comprising, a first probe provided with at least a first camera and a first illumination light source configured to illuminate an observation field of the first camera, a second probe provided with at least a second camera and a second illumination light source configured to illuminate an observation field of the second camera, and a controller. The second probe being able to move relative to the first probe such that the second illumination light source can be located within the observation field of the first camera. The controller is configured to control (1) the first illumination light source and the second illumination light source such that there is a first period in which the first illumination light source is activated and the second illumination light source is inactivated and (2) the first camera such that the first camera captures an image within the first period. Hereinafter, the above controls of (1) and (2) will be called as "controls for the first camera."

By adopting such a configuration, the first camera can capture an image with the assistance of the first illumination light source and free from bad influences from the second illumination light source.

It can be configured that the controller repetitively performs the controls for the first camera to capture a plurality of images which are used as frames of an video image. It is preferable that, in the video image, frames change every one thirtieth second or one sixtieth second to conform to ordinary image processing devices. It is possible that the controller controls to duplicate captured images and interpolate the duplicated images between the captured images to increase the number of images to be used as frames of the video image for making the video image smooth. The number of interpolated images can be decided so that the video image has thirty or sixty images, or frames, per second.

It can be configured that the controller controls the first camera such that the first camera captures an image only within the first period. By limiting the image capturing timing only within the first period, in which the first illumination light source is activated and the second illumination light source is inactivated, only images with proper lightning conditions can be captured by the first camera thus all images captured by the first camera can be used without succeeding selections.

Alternatively, it also can be configured that the controller controls the first camera such that the first camera captures an image not only within the first period but also within other periods. In such a case, as for images captured by the first camera, it is desirable that system perform succeeding selections and make only images captured within the first period valid for observation. In both ways, a user of the observation system can observe only images captured by the first camera with the assistance of the first illumination light source and free from the bad influences of the second illumination light source.

It can also be configured that the controller performs the controls for the first camera only when the controller detects that the second illumination light source is located within the observation field of the first camera. Various methods by which the controller can detect that the second illumination light source is located within the observation field of the first camera include, but not limited to, analyzing an image captured by the first camera, and using an output of a spatial position sensor which detects information indicative of a spatial relationship between the first camera and the second illumination light source.

It also can be configured that the first probe is also able to move relative to the second probe such that the first illumination light source can be located within the observation field of the second camera, and the controller is further configured to control (3) the first illumination light source and the second light illumination source such that there is a second period in which the first illumination light source is inactivated and the second illumination light source is activated and (4) the second camera such that the second camera captures an image within the second period. Hereinafter, the above controls of (3) and (4) will be called as "controls for the second camera."

In the above case, it can be configured that the controller controls the second camera such that the second camera captures an image only within the second period. By limiting the image capturing timing only within the second period, in which the first illumination light source is inactivated and the second illumination light source is activated, only images with proper lightning conditions can be captured by the second camera thus all images captured by the second camera can be used without succeeding selections.

Alternatively, it also can be configured that the controller controls the second camera such that the second camera captures an image not only within the second period but also within other periods. In such a case, as for images captured by the second camera, it is desirable that system perform succeeding selections and make only images captured within the second period valid for observation. In both ways, the user of the observation system can observe only images captured by the second camera with the assistance of the second illumination light source and free from the bad influences of the first illumination light source.

The present invention can also be recognized as an invention of an image capturing method for an observation system and an invention of a computer readable non-transitory medium storing a program for controlling an observation system.

Probes of the observation system of the invention can be, but not limited to, robots, vehicles, scopes, therapeutic or inspecting devices used in a human or animal body cavity, inspecting devices for inspecting inside of a pipe or a chamber. The each probe do not have to be a separate unit, it can be a part of a unified one body unit containing a plurality of probes. The controller can be accommodated in the first and/or the second probe, or can be provided separately.

BRIEF DESCRIPTION OF THE SEVERAL VIEWS OF THE DRAWINGS

These and other features, aspects, and advantages of the apparatus and methods of the present invention will become better understood with regard to the following description, appended claims, and accompanying drawings where:

DETAILED DESCRIPTION OF THE INVENTION

Preferred embodiments of the present invention will be described hereinafter with reference to the drawings.

An embodiment will be described below.

Figure 1:
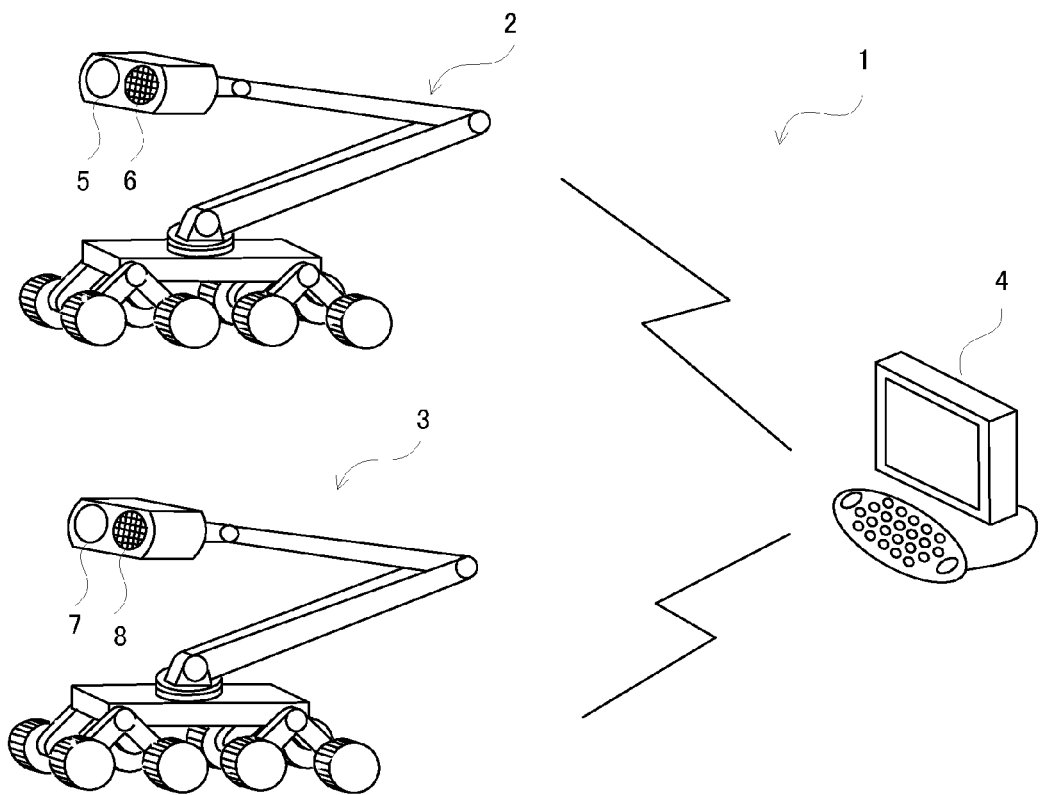
FIG. 1 is a schematic view showing a configuration of an observation system of an embodiment of the present invention.

FIG. 1 is a schematic view showing a configuration of an observation system of one embodiment of the present invention. An observation system 1 is for exploring a dangerous or a dilapidated place, comprising a movable first probe 2, and a movable second probe 3 and a controller 4. The first probe 2 comprises a first camera 5 and a first illumination light source 6 configured to illuminate an observation field of the first camera 5. The second probe 3 comprises a second camera 7 and a second illumination light source 8 configured to illuminate an observation field of the second camera 7. The first probe 2 and the second probe 3 are connected to the controller 4 wirelessly and the controller 4 controls the operations of the first probe 2 and the second probe 3. Although FIG. 1 shows only two probes, it can be configured such that the observation system 1 comprises more than two probes.

Figure 2:
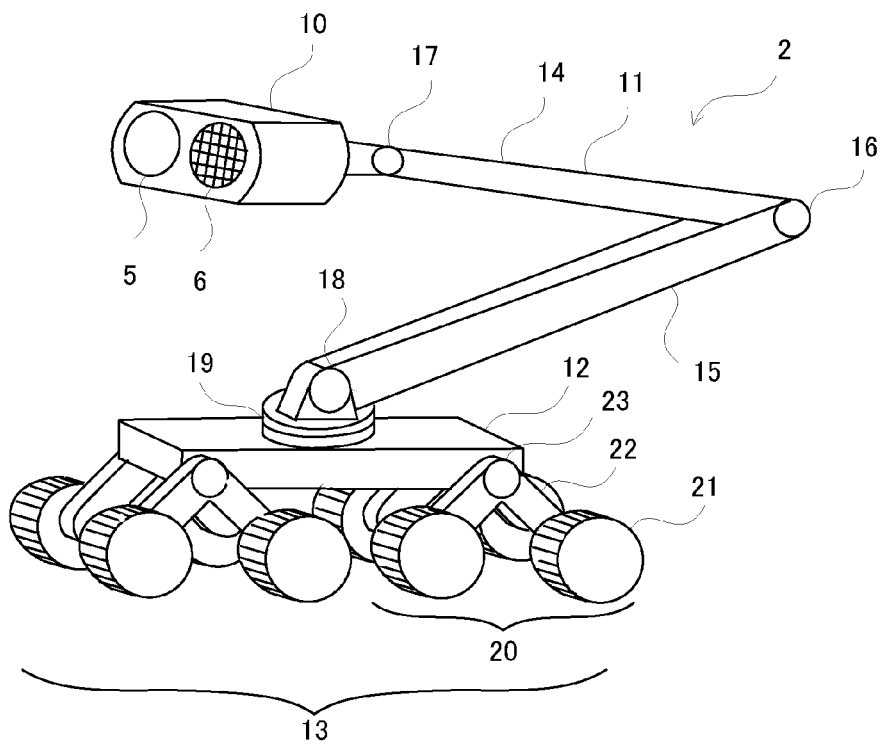
FIG. 2 is a schematic view of a first probe of the observation system of FIG. 1.

FIG. 2 is a schematic view of the first probe 2, and the second probe 3 has essentially the same configuration. The first probe 2 has a head unit 10, an articulated arm 11, a base 12, and a moving unit 13. The head unit 10 comprises the first camera 5 and the first illumination light source 6. The articulated arm 11 comprises an upper arm 14 and a lower arm 15, the both arms 14 and 15 are rotatably connected to each other with an arm joint 16. The head unit 10 is rotatably connected to the upper arm 14 with a head joint 17, and the lower arm 15 is rotatably connected to the base 12 with a base joint 18 and a swivel joint 19. The moving unit 13 has four sets of wheel units 20, each wheel unit 20 has two wheels 21 rotatably provided on both ends of an L-shaped pivot unit 22. The each L-shaped pivot unit 22 is fixed with a connection rod 23 provided at the center of the L-shaped pivot unit 22 to a side surface of the base 12. This fixing configuration enables the each wheel unit 20 to swing around the connection rod 23 in order to absorb undulations of an observation site.

Each of the arm joint 16, the head joint 17, the base joint 18, and the swivel joint 19 is equipped with a rotary actuator (not shown) for adjusting relative positions between the jointed parts, the rotation of the each rotary actuator is controlled by instructions from the controller 4. The wheels 21 provided on the wheel units 20 are rotated in the both directions by motors (not shown) provided on the back side of the wheel units 20 for forward, backward, and turning movements of the first probe 2 by instructions from the controller 4.

As the first camera 5, for example, a camera with an autofocus optical system and a sold-state imager can be used. As the first illumination light source 6, for example, an LED light, or a xenon lamp can be used. The whole configuration of the first probe 2 is preferably durable for shocks from outside, attacks of chemicals, or extreme temperatures, therefore it is preferable that many of parts are made of metals, such as high-strength steel.

Figure 3:
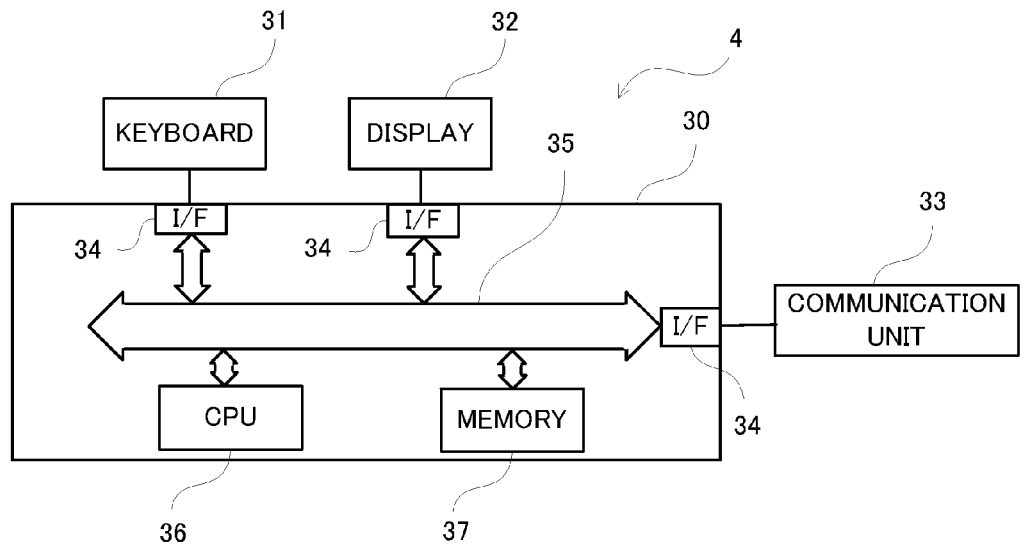
FIG. 3 is a block diagram showing a configuration of a controller of the observation system of FIG. 1.

FIG. 3 is a block diagram showing the configuration of the controller 4. The controller 4 comprises a main body 30 connected to a keyboard 31, a display 32, a communication unit 33 through interface units 34. The keyboard 31 is used by a user for inputting instructions. The display 32 is used for displaying images captured by the first probe 2 and the second probe 3 as well as texts representing input instructions and system messages. The communication unit 33 is used for wirelessly communicating with the first probe 2 and the second probe 3. The interface units 34 are used for converting signal format and timings in conformity with used communication protocols.

Inside of the main body 30, a system main bus 35 is connected to the each interface unit 34, a CPU 36, and a memory 37. The CPU 36 is an arithmetic unit used for processing a control program for the observation system 1. The memory 37 is a computer readable non-transitory storage medium used for storing the control program and data to be used by the control program.

Figure 4:
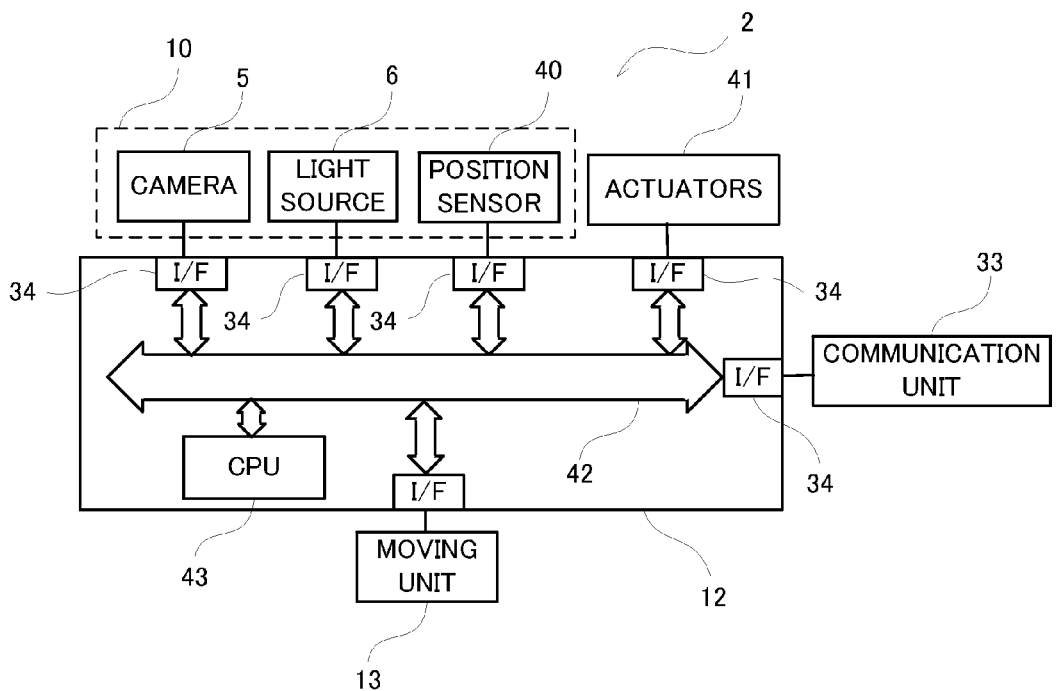
FIG. 4 is a block diagram showing a configuration of a first probe of FIG. 2.

FIG. 4 is a block diagram showing the configuration of the first probe 2, and the second probe 3 essentially has the same configuration. The base 12 of the first probe 2 is connected to the first camera 5, the first illumination light source 6, a spatial position sensor 40, and actuators 41, and the moving unit 13. The first camera 5, the first illumination light source 6, and the spatial position sensor 40 are accommodated within the head unit 10 of the first probe 2, and the spatial position sensor 40 detects the position and direction of the head unit 10. The actuators 41 represent the rotary actuators provided at the arm joint 16, the head joint 17, the base joint 18, and the swivel joint 19.

Inside of the base 12, a probe main bus 42 is connected to the each interface unit 34 and a probe CPU 43. The probe CPU 43 is an arithmetic unit used for processing a control program for the first probe 2.

Figure 5:
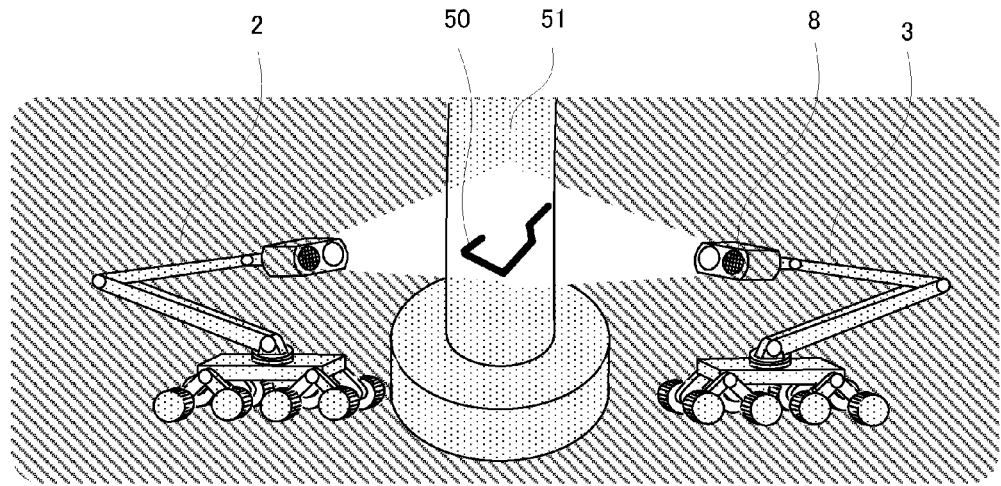
FIG. 5 is a figure showing an example explaining how the observation system of FIG. 1 is used.

FIG. 5 is a figure showing a scene explaining how the observation system 1 of the embodiment is used by an example. The scene depicted in FIG. 5 is inside of a building at a nuclear disaster site, the building is filled with high radioactive debris that prevent manual investigation. The dark environment inside of the building requires illumination to capture quality images. The first probe 2 and the second probe 3 are inspecting a crack 50 found on a coolant pipe 51 for check a leakage.

Since the first probe 2 and the second probe 3 can move independently, the second illumination light source 8 of the second probe 3 may enter an observation field of the first camera 5 of the first probe 2, and the first illumination light source 6 of the first probe 2 may enter an observation field of the second camera 7 of the second probe 3.

Figure 6A:
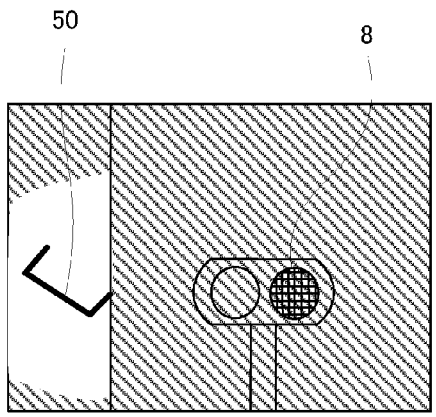
FIGS. 6A-6D are figures showing images captured by a first camera of the first probe of FIG. 2.
Figure 6B:
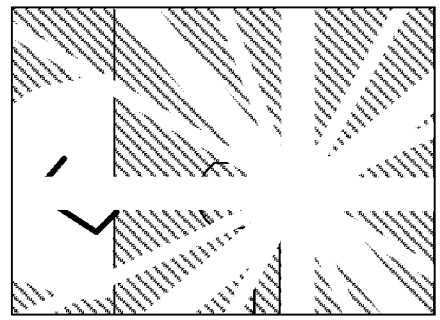

FIGS. 6A-6D are figures showing an image captured by the first camera 5 of the first probe 2 when the second illumination light source 8 of the second probe 3 locates in the observation filed of the first camera 5. FIG. 6A is an image captured by the first camera 5 when the first illumination light source 6 is activated (ON) and the second illumination light source 8 is inactivated (OFF). The crack 50 is well visible in this image with illumination light from the first illumination light source 6. FIG. 6B is an image captured by the first camera 5 when the first illumination light source 6 is activated (ON) and the second illumination light source 8 is activated (ON). Although the crack 50 is illuminated by the first illumination light source 6, it is not so apparent due to the overwhelming light from the second illumination light source 8.

Figure 6C:
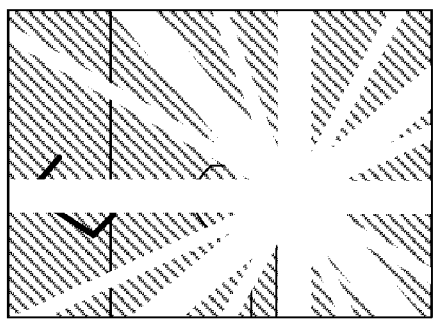
Figure 6D:
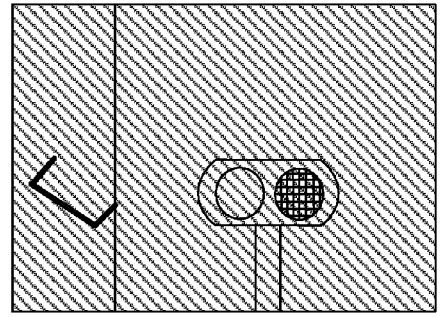

FIG. 6C is an image captured by the first camera 5 when the first illumination light source 6 is inactivated (OFF) and the second illumination light source 8 is activated (ON). The crack 50 is not illuminated by the first illumination light source 6 and the overwhelming light from the second illumination light source 8 degrades the image quality of the crack 50. FIG. 6D is an image captured by the first camera 5 when the first illumination light source 6 is inactivated (OFF) and the second illumination light source 8 is inactivated (OFF). Since there is no illumination light, the captured image is too dark to identify the crack 50.

Among the images of FIGS. 6A-6D, only the image of FIG. 6A is desirable, because only it gives a clear image of crack 50 suitable for the inspection. After all, it is desirable that the first illumination light source 6 is activated and the second illumination light source 8 is inactivated when the first camera 5 captures an image. In the same line, it is desirable that the first illumination light source 6 is inactivated and the second illumination light source 8 is activated when the second camera 7 captures an image.

In the embodiment, by executing the control program stored in the memory 37 with the CPU 36, the controller 4 controls (1) the first illumination light source 6 and the second illumination light source 8 such that there is a first period in which the first illumination light source 6 is activated and the second illumination light source 8 is inactivated and (2) the first camera 5 such that the first camera 5 captures an image within the first period.

The controller 4 also controls (3) the first illumination light source 6 and the second light illumination source 8 such that there is a second period in which the first illumination light source 6 is inactivated and the second illumination light source 8 is activated and (4) the second camera 7 such that the second camera 7 captures an image within the second period.

Figure 7:
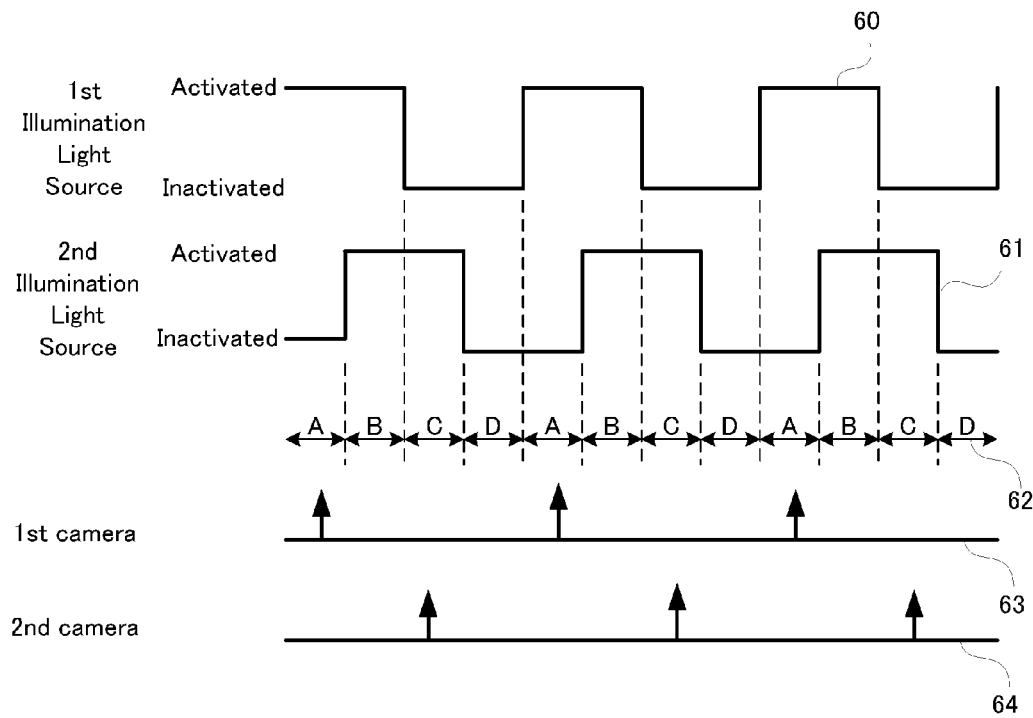
FIG. 7 is a timing chart showing activation/inactivation timings of illumination light sources and image capturing timings of cameras provided on the first probe and a second probe of the observation systems of FIG. 1.

FIG. 7 is a timing chart showing the activation/inactivation timings of the first illumination light source 6 and the second illumination light source 8, and the capturing timings of the first camera 5 and the second camera 7. In this timing chart, the controller 4 controls the first camera 5 such that the first camera 5 captures an image only within the first period in which the first illumination light source 6 is activated and the second illumination light source 8 is inactivated, and the controller 4 controls the second camera 7 such that the second camera captures an image only within the second period in which the first illumination light source 6 is inactivated and the second illumination light source 8 is activated.

A curved line 60 shows timings the first illumination light source 6 is activated and inactivated. A curved line 61 shows timings the second illumination light source 8 is activated and inactivated. The controller 4 repetitively activates and inactivates the first illumination light source 6 and the second illumination light source 8 at different timings. As shown in a line 62, there are four types of time periods: periods "A" where the first illumination light source 6 is activated and the second illumination light source 8 is inactivated, periods "B" where the first illumination light source 6 is activated and the second illumination light source is activated, periods "C" where the first illumination light source 6 is inactivated and the second illumination light source 8 is activated, and periods "D" where the first illumination light source 6 is inactivated and the second illumination light source 8 is inactivated.

A line 63 shows timings where the first camera 5 captures an image, the image capture timings are indicated by arrows. The first camera 5 captures images only within the periods "A" corresponding to the first period where the first illumination light source 6 is activated and the second illumination light source 8 is inactivated. Therefore, all images captured by the first camera 5 have desirable lighting conditions suitable for the inspection as shown FIG. 6A. When a video image is to be produced from the images captured by the first camera 5 within the periods "A," the controller controls to duplicate the captured images to interpolate the duplicated images between the captured images. This process makes the video images smooth.

A line 64 shows timings where the second camera 7 captures an image, the image capture timings are indicated by arrows. The second camera 7 captures images only within the periods "C" corresponding to the second period where the first illumination light source 6 is inactivated and the second illumination light source 8 is activated. Therefore, all images captured by the second camera 7 have desirable lighting conditions suitable for the inspection as shown FIG. 6A, so this timing chart enables an effective image capturing. When a video image is to be produced from the images captured by the second camera 7 within the periods "C," the controller controls to duplicate the captured images to interpolate the duplicated images between the captured images. This process makes the video images smooth.

It is worth mentioning that if there is no illumination light source in the observation field of the first camera 5, and if there is no illumination light source in the observation field of the second camera 7, the periods "B" can also be used as timings to capture images by the first camera 5 and the second camera 7. Even in such a situation, the periods "D" are useless because there is no illumination light available for image capturing. Therefore, it is desirable that the controller 4 controls such that a period in which both of the first illumination light source 6 and the second illumination light source 8 are inactivated is less than half of the whole period.

It is also worth mentioning that it is required that the controller 4 controls such that a period in which the first camera 5 captures an image is shorter than or equal to the first period in which the first illumination light source 6 is activated and the second illumination light source 8 is inactivated. Otherwise, the period in which the first camera 5 captures an image would exceed the first period. Since a whole image capturing period of the first camera 5 falls within the first period in which lightning conditions are excellent for the first camera 5, the first camera 5 can well perform some automatic controls, for example, an automatic focus control, an automatic exposure control and an automatic white-balance control.

In the same manner, it is required that the controller 4 controls such that a period in which the second camera 7 captures an image is shorter than or equal to the second period in which the first illumination light source 6 is inactivated and the second illumination light source 8 is activated. Otherwise, the period in which the second camera 7 captures an image would exceed the second period. Since a whole image capturing period of the second camera 7 falls within the second period in which lightning conditions are excellent for the second camera 7, the second camera 7 can well perform some automatic controls, for example, an automatic focus control, an automatic exposure control and an automatic white-balance control.

Figure 8:
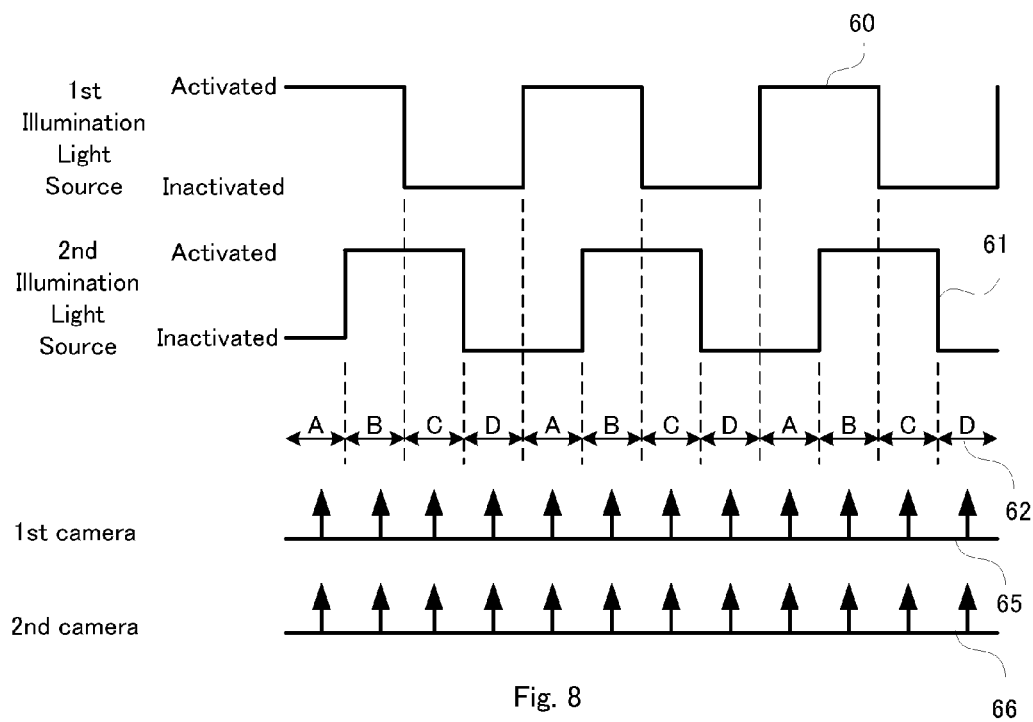
FIG. 8 is another possible timing chart.

FIG. 8 is a modified timing chart showing the activation/inactivation timings of the first illumination light source 6 and the second illumination light source 8, and the capturing timings of the first camera 5 and the second camera 7. In this timing chart, the controller 4 controls the first camera 5 such that the first camera 5 captures an image not only within the period "A" corresponding to the first period in which the first illumination light source 6 is activated and the second illumination light source 8 is inactivated but also within other periods. As for images captured by the first camera 5, the observation system 1 makes images captured only within the first period valid for observation and images captured within the other periods are discarded.

The controller 4 controls the second camera 7 such that the second camera 7 captures an image not only within the period "C" corresponding to the second period in which the first illumination light source 6 is inactivated and the second illumination light source 8 is activated but also within other periods. As for images captured by the second camera 7, the observation system 1 makes images captured only within the second period valid for observation and images captured within the other periods are discarded.

The differences between the timing chart of FIG. 7 and that of FIG. 8 are timings where the first camera 5 captures images and timings where the second camera 7 captures images. In FIG. 8, as shown in lines 65, 66, the first camera 5 and the second camera 7 capture images within the periods "A," "B," "C," and "D," but the captured images are discarded later except ones captured within the period "A" for images captured by the first camera 5 and ones captured within the period "C" for images captured by the second camera 7. This timing chart enables simple control of the first camera 5 and the second camera 7.

Figure 9:
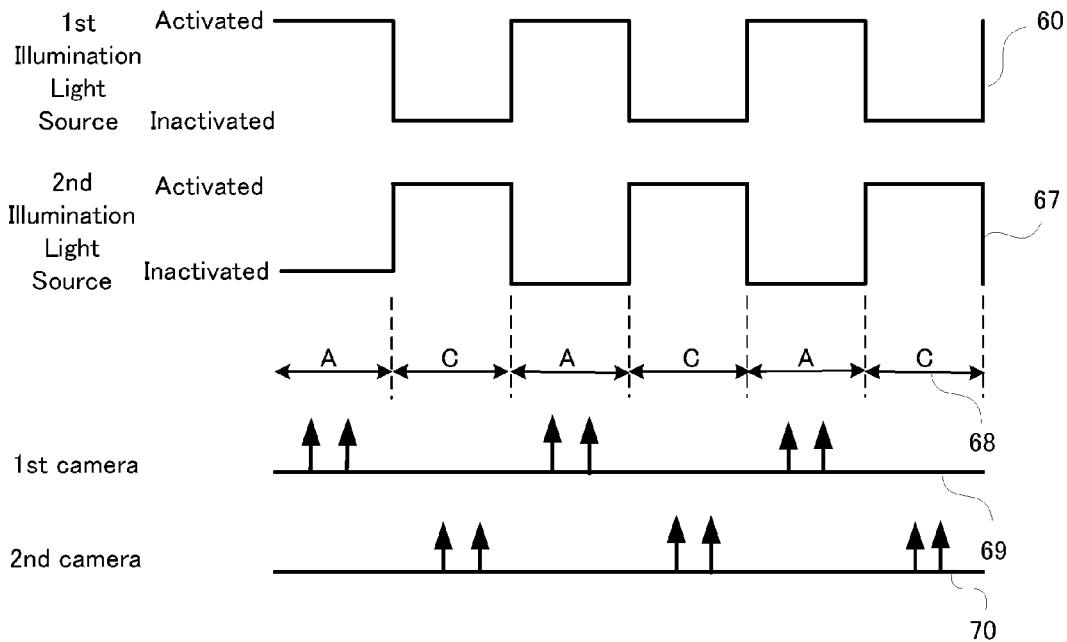
FIG. 9 is further another possible timing chart.

FIG. 9 is further another timing chart showing the activation/inactivation timings of the first illumination light source 6 and the second illumination light source 8, and the capturing timings of the first camera 5 and the second camera 7. As apparent by comparing between the line 60 and a line 67, in this timing chart, the controller 4 controls the first illumination light source 6 and the second illumination light source 8 such that the two light sources have reverse timing phases of the activation/inactivation.

As shown in a line 68, there are only the periods "A" suitable for image capturing by the first camera 5 and the periods "C" suitable for image capturing by the second camera 7, and there are not the periods "B" and the periods "D", none of which are suitable for image capturing. Therefore, all periods are well available for image capturing by either the first camera 5 or the second camera 7.

As shown in a lines 69, 70, the first camera 5 and the second camera 7 capture two consecutive images at one timing. It can be configured that each of the two consecutive images uses different wave lengths for each of specific purposes.

Figure 10:
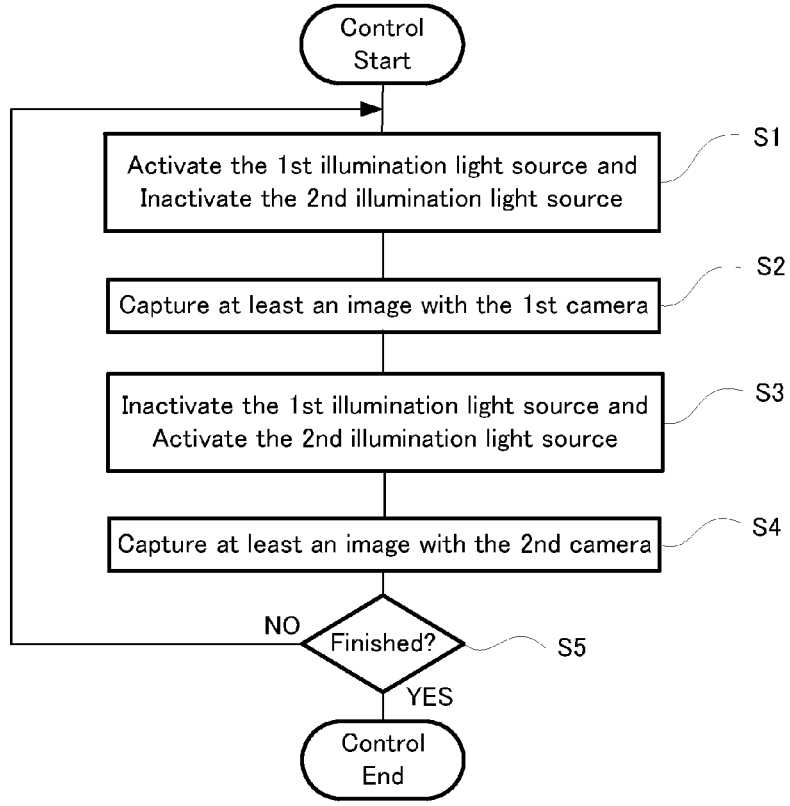
FIG. 10 is a flowchart showing operations for capturing images, the operations are controlled by a controller of FIG. 3.

FIG. 10 is a flowchart showing operations for capturing an image, the operations are controlled by the controller 4. Inside of the controller 4, the control program stored in the memory 37, which is a computer readable non-transitory medium, has descriptions to have the CPU 36 do the following procedures.

First, the controller 4 activates the first illumination light source 6 and inactivates the second illumination light source 8 in Step S1. The controller 4 captures at least an image with the first camera 5 in Step S2. The controller 4 inactivates the first illumination light source 6 and activates the second illumination light source 8 in Step S3. The controller 4 captures at least an image with the second camera 7 in Step S4. Then the controller 4 judges whether all necessary images have captured in Step S5. If the answer is no, the controller 4 goes back to the Step 1 and repeats the procedures from Step 1 to Step S4 again. If the answer is yes, the flow ends.

Figure 11:
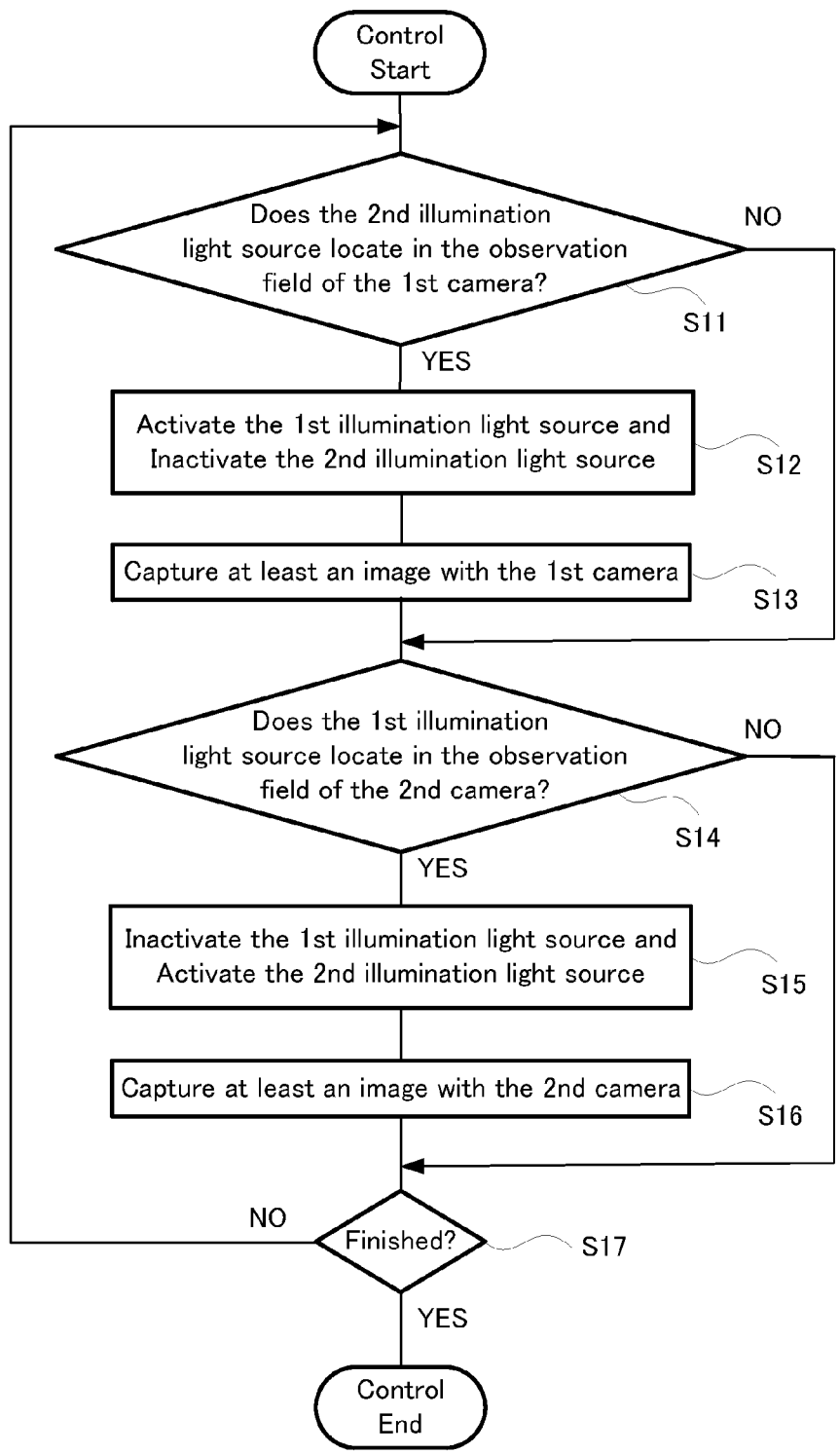
FIG. 11 is a flowchart showing another possible operations for capturing images.

FIG. 11 is modified another flowchart showing operations for capturing an image. First, the controller 4 decides whether the second illumination light source 8 locates in the observation field of the first camera 5 in Step S11. If the answer is yes, the controller 4 activates the first illumination light source 6 and inactivates the second illumination light source 8 in Step S12. Then the controller 4 captures at least an image with the first camera 5 in Step S13. However, if the answer in Step S11 is no, the controller 4 skips Steps S12 and S13.

Next, the controller 4 decides whether the first illumination light source 6 locates in the observation field of the second camera 7 in Step S14. If the answer is yes, the controller 4 inactivates the first illumination light source 6 and activates the second illumination light source 8 in Step S15. Then the controller 4 captures at least an image with the second camera 7 in Step S16. However, if the answer in Step S14 is no, the controller 4 skips Steps S15 and S16.

Lastly, the controller 4 judges whether all necessary images have captured in Step S17. If the answer is no, the controller 4 goes back to the Step 11 and repeats the procedures from Step 11 to Step S16 again. If the answer is yes, the flow ends.

The controller 4 can make the decisions of Steps S11 and S14 in many ways. For example, the controller 4 can use the output of the spatial position sensors 40 of the first probe 2 and the second probes 3, which detect information indicative of a spatial relationship between the first camera 5 and the second illumination light source 8, and a spatial relationship between the second camera 7 and the first illumination light source 6. Otherwise, the controller 4 can analyze captured images by the first camera 5 and the second camera 7 for the decisions. The controller 4 judges if there is strong light of the either illumination light source in the analyzed images for the decisions.

According to the above embodiment, an image, assisted with illumination light which illuminates an object in the image to enhance the visibility of the object, and without illumination light which degrades the image by light flooding, can be obtained.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. An observation system having a plurality of probes, the system comprising:
   a first probe provided with at least a first camera and a first illumination light source configured to illuminate an observation field of the first camera;
   a second probe provided with at least a second camera and a second illumination light source configured to illuminate an observation field of the second camera, the second probe being able to move relative to the first probe such that the second illumination light source can be located within the observation field of the first camera; and
   a controller configured at least with a memory storing a control program and a CPU used for processing the control program to control (1) the first illumination light source and the second illumination light source such that there is a first period in which the first illumination light source is activated and the second illumination light source is inactivated and (2) the first camera such that the first camera captures an image only within the first period, wherein the controller performs the controls of (1) and (2) only when the controller detects that the second illumination light source is located within the observation field of the first camera.

2. The observation system according to claim 1, wherein the controller repetitively performs the controls of (1) and (2) to acquire a video image from a plurality of the captured images.

3. The observation system according to claim 1, wherein the controller detects that the second illumination source is located within the observation field of the first camera by analyzing an image captured by the first camera.

4. The observation system according to claim 1, wherein the controller detects that the second illumination source is located within the observation field of the first camera by using an output of a spatial position sensor which detects information indicative of a spatial relationship between the first camera and the second illumination light source.

5. The observation system according to claim 1, wherein the first probe is also able to move relative to the second probe such that the first illumination light source can be located within the observation field of the second camera, and
   the controller is further configured to control (3) the first illumination light source and the second light illumination source such that there is a second period in which the first illumination light source is inactivated and the second illumination light source is activated and (4) the second camera such that the second camera captures an image within the second period.

6. The observation system according to claim 5, wherein the controller controls the second camera such that the second camera captures an image only within the second period.

7. The observation system according to claim 5, wherein the controller controls the second camera such that the second camera captures an image not only within the second period, but as for an image captured by the second camera the observation system makes the image captured only within the second period valid for observation.

8. An image capturing method for an observation system at least having (1) a first probe provided with at least a first camera and a first illumination light source configured to illuminate an observation field of the first camera, and (2) a second probe provided with at least a second camera and a second illumination light source configured to illuminate an observation field of the second camera, the second probe being able to move relative to the first probe such that the second illumination light source can be located within the observation field of the first camera, the method comprising:
   an illumination act of controlling the first illumination light source and the second illumination light source such that there is a first period in which the first illumination light source is activated and the second illumination light source is inactivated; and
   an image capturing act of capturing an image with the first camera only within the first period, wherein the illumination act and the image capturing act are performed only when it is detected that the second illumination light source is located within the observation field of the first camera.

9. The image capturing method for an observation system according to claim 8, wherein the illumination act and the image capturing act are repetitively performed to acquire a video image from a plurality of the captured images.

10. The image capturing method for an observation system according to claim 8, wherein
    the observation system detects that the second illumination source is located within the observation field of the first camera by analyzing an image captured by the first camera.

11. The image capturing method for an observation system according to claim 8, wherein
    the observation system detects that the second illumination source is located within the observation field of the first camera by using an output of a spatial position sensor which detects information indicative of a spatial relationship between the first camera and the second illumination light source.

12. The image capturing method for an observation system according to claim 8, wherein
    the first probe is also able to move relative to the second probe such that the first illumination light source can be located within the observation field of the second camera, and
    the first illumination light source and the second light illumination source are further controlled such that there is a second period in which the first illumination light source is inactivated and the second illumination light source is activated in the illumination act, and
    the second camera captures an image within the second period in the image capturing act.

13. The image capturing method for observation system according to claim 12, wherein the second camera captures an image only within the second period.

14. The image capturing method for an observation system according to claim 12, wherein the second camera captures an image not only within the second period in the image capturing act, but as for an image captured by the second camera the observation system makes the image captured only within the second period valid for observation.

15. A computer readable non-transitory medium storing a program for controlling an observation system at least having (1) a first probe provided with at least a first camera and a first illumination light source configured to illuminate an observation field of the first camera, and (2) a second probe provided with at least a second camera and a second illumination light source configured to illuminate an observation field of the second camera, the second probe being able to move relative to the first probe such that the second illumination light source can be located within the observation field of the first camera, the program has a computer of the observation system perform:

an illumination act of controlling the first illumination light source and the second illumination light source such that there is a first period in which the first illumination light source is activated and the second illumination light source is inactivated; and an image capturing act of capturing an image with the first camera only within the first period, wherein the illumination act and the image capturing act are performed only when it is detected that the second illumination light source is located within the observation field of the first camera.

16. An observation system having a plurality of probes, the system comprising:

a first probe provided with at least a first camera and a first illumination light source configured to illuminate an observation field of the first camera;

a second probe provided with at least a second camera and a second illumination light source configured to illuminate an observation field of the second camera, the second probe being able to move relative to the first probe such that the second illumination light source can be located within the observation field of the first camera; and a controller configured at least with a memory storing a control program and a CPU used for processing the control program to control (1) the first illumination light source and the second illumination light source such that there is a first period in which the first illumination light source is activated and the second illumination light source is inactivated and (2) the first camera such that the first camera captures an image within the first period, wherein the controller controls the first camera such that the first camera captures an image not only within the first period, but as for an image captured by the first camera the observation system makes the image captured only within the first period valid for observation.

17. The observation system according to claim 16, wherein the controller repetitively performs the controls of (1) and (2) to acquire a video image from a plurality of the captured images.

18. The observation system according to claim 16, wherein the controller performs the controls of (1) and (2) only when the controller detects that the second illumination light source is located within the observation field of the first camera.

19. The observation system according to claim 16, wherein the first probe is also able to move relative to the second probe such that the first illumination light source can be located within the observation field of the second camera, and the controller is further configured to control (3) the first illumination light source and the second light illumination source such that there is a second period in which the first illumination light source is inactivated and the second illumination light source is activated and (4) the second camera such that the second camera captures an image within the second period.

20. The observation system according to claim 19, wherein the controller controls the second camera such that the second camera captures an image only within the second period.

21. The observation system according to claim 19, wherein the controller controls the second camera such that the second camera captures an image not only within the second period, but as for an image captured by the second camera the observation system makes the image captured only within the second period valid for observation.

22. An image capturing method for an observation system at least having (1) a first probe provided with at least a first camera and a first illumination light source configured to illuminate an observation field of the first camera, and (2) a second probe provided with at least a second camera and a second illumination light source configured to illuminate an observation field of the second camera, the second probe being able to move relative to the first probe such that the second illumination light source can be located within the observation field of the first camera, the method comprising:

an illumination act of controlling the first illumination light source and the second illumination light source such that there is a first period in which the first illumination light source is activated and the second illumination light source is inactivated; and an image capturing act of capturing an image with the first camera within the first period, wherein the first camera captures an image not only in the first period in the image capturing act, but as for an image captured by the first camera the observation system makes the image captured only within the first period valid for observation.

23. The image capturing method for an observation system according to claim 22, wherein the illumination act and the image capturing act are repetitively performed to acquire a video image from a plurality of the captured images.

24. The image capturing method for an observation system according to claim 22, wherein the illumination act and the image capturing act are performed only when the second illumination light source is located within the observation field of the first camera.

25. The image capturing method for an observation system according to claim 22, wherein the first probe is also able to move relative to the second probe such that the first illumination light source can be located within the observation field of the second camera, and the first illumination light source and the second light illumination source are further controlled such that there is a second period in which the first illumination light source is inactivated and the second illumination light source is activated in the illumination act, and the second camera captures an image within the second period in the image capturing act.

26. The image capturing method for observation system according to claim 25, wherein the second camera captures an image only within the second period.

27. The image capturing method for an observation system according to claim 25, wherein the second camera captures an image not only within the second period in the image capturing act, but as for an image captured by the second camera the observation system makes the image captured only within the second period valid for observation.

28. A computer readable non-transitory medium storing a program for controlling an observation system at least having (1) a first probe provided with at least a first camera and a first illumination light source configured to illuminate an observation field of the first camera, and (2) a second probe provided with at least a second camera and a second illumination light source configured to illuminate an observation field of the second camera, the second probe being able to move relative to the first probe such that the second illumination light source can be located within the observation field of the first camera, the program has a computer of the observation system perform:

an illumination act of controlling the first illumination light source and the second illumination light source such that there is a first period in which the first illumination light source is activated and the second illumination light source is inactivated; and an image capturing act of capturing an image with the first camera within the first period, wherein the program has the computer of the observation system capture an image not only in the first period in the image capturing act, but as for an image captured by the first camera the program has the computer of the observation system make the image captured only within the first period valid for observation.

* * * * *